US008805932B2

(12) United States Patent
Ciminiera et al.

(10) Patent No.: US 8,805,932 B2
(45) Date of Patent: Aug. 12, 2014

(54) SHARING OF DIGITAL CONTENTS IN P2P NETWORKS EXPLOITING LOCALIZATION DATA

(75) Inventors: Luigi Ciminiera, Turin (IT); Marco Papa Manzillo, Turin (IT); Vinicio Vercellone, Turin (IT); Mario Ullio, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 13/505,975

(22) PCT Filed: Nov. 3, 2009

(86) PCT No.: PCT/EP2009/064546
§ 371 (c)(1),
(2), (4) Date: May 3, 2012

(87) PCT Pub. No.: WO2011/054375
PCT Pub. Date: May 12, 2011

(65) Prior Publication Data
US 2012/0221647 A1    Aug. 30, 2012

(51) Int. Cl.
*G06F 15/16* (2006.01)
*H04L 29/08* (2006.01)

(52) U.S. Cl.
CPC ........... *H04L 67/104* (2013.01); *H04L 67/1095* (2013.01)
USPC ........................................................ 709/204

(58) Field of Classification Search
CPC .................... H04L 67/104; H04L 67/1095
USPC ........................................................ 709/204
See application file for complete search history.

(56) References Cited

U.S. PATENT DOCUMENTS

| 2003/0126122 A1* | 7/2003 | Bosley et al. ..................... 707/3 |
| 2005/0120133 A1 | 6/2005 | Slack-Smith |
| 2005/0198286 A1* | 9/2005 | Xu et al. ........................ 709/225 |
| 2007/0150575 A1 | 6/2007 | Lowery et al. |

FOREIGN PATENT DOCUMENTS

| WO | 03/005246 A2 | 1/2003 |
| WO | 2004/027581 A2 | 4/2004 |
| WO | 2005/076553 A1 | 8/2005 |

OTHER PUBLICATIONS

T. Stading, et al., "Peer-to-Peer Caching Schemes to Address Flash Crowds", Peer-to-Peer Systems, 2002, pp. 203-212.

(Continued)

*Primary Examiner* — Hee Soo Kim
(74) *Attorney, Agent, or Firm* — Banner & Witcoff, Ltd.

(57) ABSTRACT

A method for enabling sharing of content files among nodes of a P2P network is provided. The P2P network comprises sub-networks each including a respective plurality of nodes capable of storing content files. Each sub-network has an associated corresponding hash table for indexing content files stored in the nodes. The hash table is distributed among at least some of the nodes of the sub-network. For each content file stored in at least one node, the hash table comprises a corresponding node list of the sub-network nodes which store the content file. The method comprises associating each node of the sub-network listed in the node list corresponding to a content file with localization data indicating the localization of the node within the sub-network. The localization data defines a corresponding preferential list of the nodes storing the content file for downloading the content file by a requesting node.

19 Claims, 7 Drawing Sheets

(56) References Cited

OTHER PUBLICATIONS

V. Aggarwal, et al., "Can ISPS and P2P users cooperate for improved performance?", SIGCOMM Computer Communication Review, vol. 37, No. 3, Jul. 2007, pp. 29-40.

D. Choffnes, et al., "Taming the torrent: a pratical approach to reducing cross-isp traffic in peer-to-peer systems", Proceedings of the ACM SIGCOMM 2008 Conference on Data Communication, Seattle, WA, USA: ACM, Aug. 2008, pp. 363-374.

H. Xie et al., "P4P: provider portal for applications", Proceedings of the ACM SIGCOMM 2008 Conference on Data Communication, Seattle, WA, USA: ACM, 2008, pp. 351-362.

Y. Lihang et al., "pcVOD: Internet Peer-to-Peer Video-On-Demand with Storage Caching on Peers", Proceedings of the International Conference on Distributedmultimedia Systems, Sep. 1, 2005; XP002460362.

I. Clarke, et al., "Freenet: a distributed anonymous information storage and retrieval system", Proceedings of the International Workshop on Design Issues Inanonymity and Unobservability, Jan. 1, 2001, pp. 1-21, XP002974738.

F. Dabek, eta l., "Wide-area cooperative storage with CFS", Proceedings of the ACM Symposium on Operating Systems Principles, Oct. 1, 2001, pp. 202-215, XP002974739.

International Search Report and Written Opinion mailed Feb. 15, 2010, PCT/EP2009/064546.

* cited by examiner

SHARING OF DIGITAL CONTENTS IN P2P NETWORKS EXPLOITING LOCALIZATION DATA

CROSS REFERENCE TO RELATED APPLICATIONS

This is a U.S. National Phase Application under 35 U.S.C. §371 of International Application No. PCT/EP2009/064546, filed Nov. 3, 2009, which was published Under PCT Article 21(2), the entire contents of which are incorporated herein by reference.

The solution according to an embodiment of the present invention relates the information and communications technology field. Particularly, such solution concerns an improved method and a system for accessing content files in peer-to-peer based networks.

Generally speaking, a computer network (or, to be more exact, an overlay network) having the so-called peer-to-peer architecture is formed by a plurality of nodes that simultaneously function as both clients and servers toward the other nodes of the network. In the present description, with the term "node" it is intended any suitably programmed data processing system capable of receiving, transmitting, storing and processing digital data, such as a personal computer, a laptop, a Personal Digital Assistant (PDA), and the like, managed by a suitable software installed thereon.

Unlike the computer networks having a client-server architecture, in a computer network arranged according to a peer-to-peer architecture—from now on, briefly referred to as "P2P network"—any node is capable of starting and/or completing a transaction of digital contents toward any other node. Even though each node of a P2P network is generally different from the other nodes of the network in terms of computational resource, bandwidth and stored data, all the nodes are considered to be equivalent "peers" each one of them having the rights of downloading/uploading digital contents to/from the others peers. A P2P network accumulates the different computational resources and the bandwidth of each peer rather than employing a conventional centralized system where a relatively low number of servers are in charge of managing the transactions of digital contents toward the clients.

P2P networks are presently exploited in different fields of application, since the advantageous features offered by such network architecture may be useful for many purposes. Among the possible fields of application, the most common one at the present time is surely the file sharing. Particularly, by employing a P2P network architecture, the content files stored in each peer can be easily shared among the other peers of the network, allowing them to be exchanged in an efficient way by exploiting the computational resources and the bandwidth accumulated from the various peers themselves. With the very generic term of "content file" it is intended a wide category of data, comprising audio data, video data, text data, application software or anything data in digital format. Just to mention another field of application, P2P networks may be also employed for managing transfer of real time data, such as in the media streaming (both video and audio) and in the telephone (e.g., Voice over Internet Protocol) applications.

Several studies have been conducted in the last years for solving or at least reducing the main drawbacks affecting the P2P networks, in such a way to improve the reliability and the efficiency thereof.

For example, one of the main drawbacks affecting the P2P networks actually employed for implementing file sharing services consists in that the peers which are transmitting files are typically matched with the peers that are receiving the transmitted files without taking into account the localization of the (transmitting and receiving) peers within the network. In this context, it has to be appreciated that with the term "localization of a peer" it is intended the physical localization of the data processing system corresponding to such peer within the physical network (e.g., the telephone network).

At the present time, the known applications that run on the data processing systems forming the peers of a P2P network for the management thereof (from now on, simply referred to as "P2P applications") list the shared content files coming from the various peers into an indexing system, which may implemented by means of one or more dedicated servers or by means of a structured or an unstructured network. When the P2P application of a generic peer requests one or more of said shared content files, the indexing system is queried by such P2P application itself; the indexing system accordingly replies with a response list of the peers which actually own such content files (or at least chunks thereof). Since the use of such indexing systems is a burden for the network traffic, such response list is not exhaustive, but instead it is limited to a prefixed number of results. Moreover, as already cited in the previous, the set of results included in such response list is generated by the indexing system without taking in consideration the localizations of the peers owning the desired content files with respect to the localization of the peer that have made the request.

In order to solve this problem, the paper "Can ISPS and P2P users cooperate for improved performance?" by Aggarwal, Feldmann and Scheideler, SIGCOMM Comput. Commun. Rev., vol. 37, 2007, pages 29-40, discloses a solution in which the Internet Service Providers (ISP) are provided with a particular function denoted "oracle". When a peer receives the response list depicting the peers which actually own the requested content files, the response list is forwarded to the ISP of the requesting peer. Through such oracle function, said response list is ordered based on the distance among the listed peers and the requesting one. The oracle function is capable of carrying out such tasks because the ISP has a deep knowledge of its network, which allow the distance of the various peers to be quantified by means of routing information.

However, such solution is affected by some drawbacks. Firstly, a malicious user may be able to derive the network topology managed by the ISP through a simple sequence of properly structured requests. Moreover, the efficiency obtainable by employing said solution is not really high, since the oracle function performs a sorting using the peers depicted in the response list only, which response list is not exhaustive, but instead it is limited to a prefixed number of results. If the content files searched by the requesting peer are not really popular, and the number of results is lower than the prefixed number, the oracle function is actually capable of allowing the desired content files to be obtained in an optimum way. However, if the requested content files are very popular, the oracle function is forced to perform the sorting operations on a set of results that is not representative of the whole situation, and thus, the efficiency obtainable with this solution is really low.

Another known solution disclosed in "Taming the torrent: a practical approach to reducing cross-isp traffic in peer-to-peer systems" by D. R. Choffness and Bustamante, Proceedings of the ACM SIGCOMM 2008 conference on Data communication, Seattle, Wash., USA: ACM, 2008, pages 363-374. According to this solution, it is possible to obtain some indications about the localization of a peer within the overlay network by exploiting the presence of the Content Delivery Network (CDN) mirror sites. In particular, if two different peers are redirected toward the same mirror site, it means that there is a relatively high probability that the localizations of such two peers are close to each other. Therefore, once a peer has obtained the response list from the indexing system, it may contact all the peers included in the list, and evaluate their mutual distances by observing the mirror sites thereof. This is however an inefficient solution, since the mirror sites are determined by the CDN based on a set of criteria wherein the localization is only a parameter among the others. More importantly, said solution suffers from the same drawback affecting the previous solution, i.e., the number of results in the response list that is limited to a prefixed value.

A further solution known in the art is proposed in "P4P: provider portal for applications", by Xie et al., *Proceedings of the ACM SIGCOMM* 2008 *conference on Data communication*, Seattle, Wash., USA: ACM, 2008, pages 351-362, wherein a peer-to-peer network architecture called "P4P" is disclosed. According to this solution, the ISPs have to provide on demand a wide range of information regarding the network (such as the policy and the cost of the various destinations) to the indexing system. A drawback of this solution is given by the requirement of disclosing confidential information (such as the network topology). However, the main drawback of this solution consists in that the indexing system would be loaded with a too high amount of data, which cannot be efficiently processed using the computing power of the presently available data processing systems.

Another drawback affecting the P2P networks actually employed for implementing file sharing services regards the difficulty with which the content files that are quite uncommon (i.e., the files that are shared by a small number of peers only) manage to spread across the network. This problem is felt deeply when said uncommon content files are requested by a relatively high number of peers at the same time, originating a bottleneck in the download process of such content files. In order to solve this problem, known solutions provide for creating additional copies of said uncommon content files, so as to increase the sources for the downloading thereof from the requesting peers. In this way, the spread of such uncommon content files across the P2P network would be strongly favored. Such additional copies may be stored into a set of peers among the peers forming the P2P network, so as to implement a content files "distributed caching" system.

The main concepts of distributed caching systems are illustrated in the document "Peer-to-Peer Caching schemes to Address Flash Crowds" by Stading, Maniatis and Baker, *Peer-to-Peer Systems,* 2002, pages 203-212. Briefly, the idea of distributed caching system is initially born in order to resolve the drawbacks affecting the Flash Crowds. Said solution is based on the formation of a so-called web server confederation, including a plurality of servers that are exploited by the various data processing system connected to the network for lightening the computational load thereof. According to this solution, when a data processing system of the network is in a heavily burdened condition, i.e., if the network traffic pertaining a certain content file which is stored in such data processing system is particularly high, one or more copies of such content file are stored (cached) in one or more corresponding servers of the web server confederation. In this way, part of the traffic that was directed to the data processing system storing such content file is deviated to the web server confederation. However, this solution is not suitable for the networks having a P2P architecture, wherein the servers are replaced by the peers. Indeed, in a P2P network each peer is different from the others, and thus a generic peer may have not sufficient disk space for storing the copies of a content file of another peer, or it may not desire to offer its disk space for this purpose. Moreover, with this solution an intruder may be able to fill the disk space of the various peers which are offering a cache service with useless data. In addition, since the content files cached in the various peers are stored in a plain, unencrypted way, legal problems may arise because the owner of the data processing system corresponding to a determined peer would have the duty of verifying whether the content files to be cached from other peers are copyright protected or not.

The U.S. patent application US2005/0120133 discloses a distributed cache system adapted to be implemented in hybrid P2P network architectures. In a hybrid P2P network, the indexing system is implemented by means of a centralized server, while only the transfer of the content files is performed in a decentralized way. Because the centralized server has a global vision of the whole network, such server may assess which are the content files shared by the various peers that require to be cached, and decide which are the peers that have to offer disk space for the caching. In this way, the risk of wasting disk space for storing useless data is avoided, since the centralized server can be considered as authoritative. However, this solution does not take into account the amount of traffic that is actually involving each peer of the network; therefore, the centralized server may instruct a peer that is already burdened to cache an additional content file. Moreover, this solution is affected by the same legal drawbacks previously mentioned. In addition, such solution is adapted to be implemented in hybrid P2P network architectures only, while the future trends aim to completely decentralized P2P network architectures.

The U.S. patent application US2007/0150575 discloses a method for increasing the traffic localization of a network by exploiting a distributed cache system. In greater detail, the peers that are within a same ISP may be arranged to form a corresponding distributed caching system. This solution provides that each peer is responsible for the caching of a determined subset of content files. If a specific content file is not available (i.e., if the peer that is the responsible for that content file does not store a copy thereof), the content file is downloaded from the internet, and transmitted to the node that is responsible for its caching. This solution as well is affected by the same drawbacks previously mentioned, since even in this case the amount of traffic that is actually involving each peer of the network is not taken into account, and the owner of the data processing system corresponding to a determined peer would have the duty of verifying whether the content files to be cached from other peers are copyright protected or not.

In view of the above the Applicant has tackled the problem of how to improve the indexing system of the presently available P2P networks. For this purpose, a novel method for enabling sharing of content files among nodes of a P2P network is provided. The P2P network comprises a plurality of sub-networks each one including a respective plurality of nodes capable of storing content files. Each sub-network has associated therewith a corresponding hash table for the indexing of the content files stored in the nodes of the sub-network; said hash table is distributed among at least some of the nodes of the sub-network. For each content file stored in at least one node of the sub-network, said hash table comprises a corresponding node list of the sub-network nodes which store said content file. The method comprises associating to each node of the sub-network listed in the node list corresponding to a content file localization data providing an indication of the localization of said node within said sub-network; the method further comprises exploiting said localization data for defining a corresponding preferential list of the nodes storing said content file for the downloading of said content file by a requesting node.

Another aspect of the present invention regards a P2P network.

A still further aspect of the present invention regards a client software executable by a node of a P2P network.

BRIEF DESCRIPTION OF THE DRAWINGS

The invention according to one or more embodiments of the present invention, as well as further features and advantages thereof will be best understood by reference to the following detailed description, given purely by way of a non-restrictive indication, to be read in conjunction with the accompanying drawings. Particularly.

DETAILED DESCRIPTION

In the following, a solution according to exemplary and non-limitative embodiments of the present invention will be presented and described in detail. Those skilled in the art will however recognize that several modifications to the described embodiments are possible, and that the present invention can be embodied in different ways.

Figure 1:
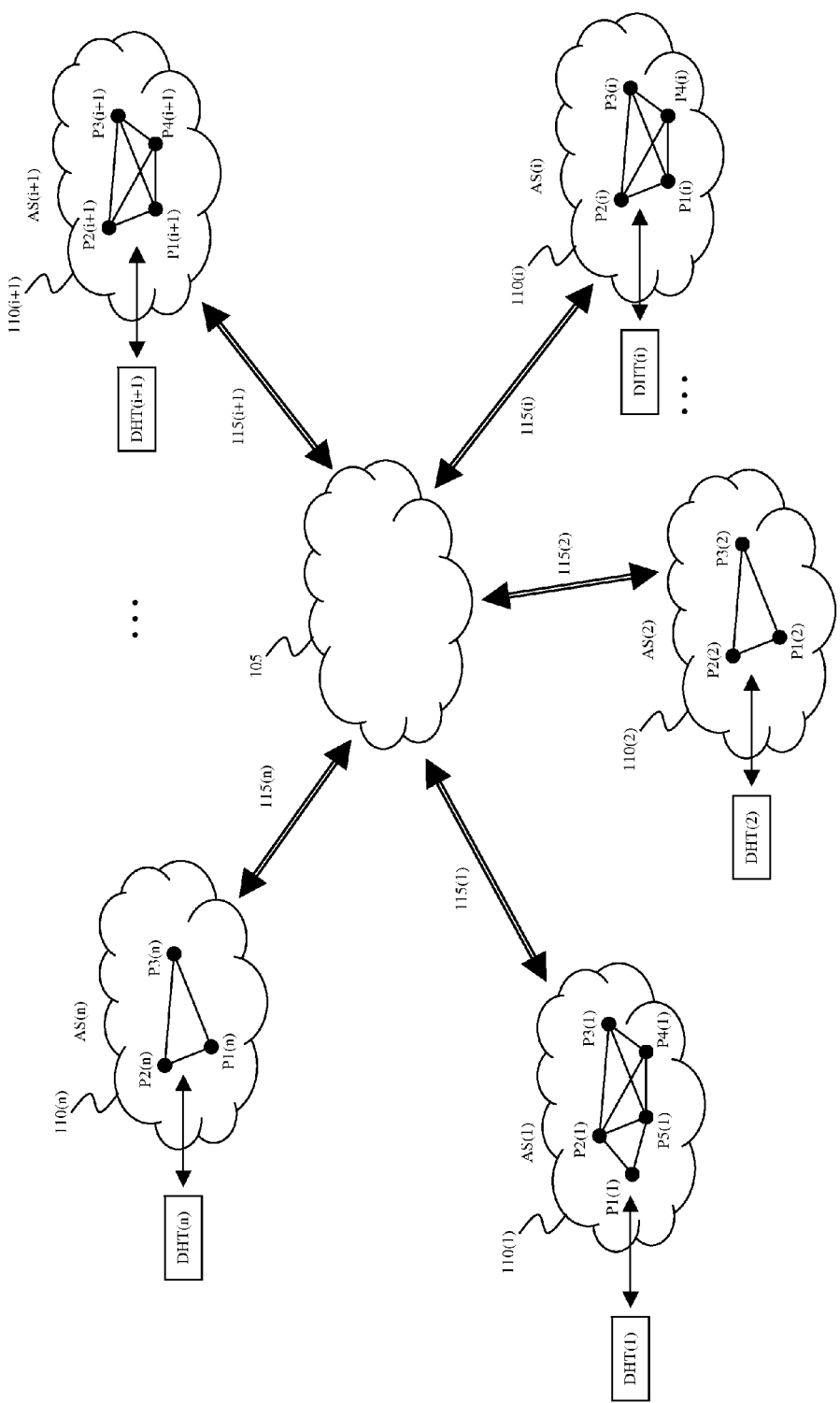
FIG. 1 illustrates an exemplary topology of a P2P network according to an embodiment of the present invention.

With reference in particular to FIG. 1, an exemplary topology of a P2P network in which the concepts of the present invention may be applied is schematically illustrated with the reference 100.

Particularly, the P2P network 100 is arranged in two different levels, and namely in a first level, referred to as "legacy network", and in a second level, referred to as "localized network". As it will be described in the following of the present description, the main elements of the solutions proposed according to the various embodiments of the present invention reside in the second level of the P2P network 100, i.e., in the localized network.

The legacy network, identified in the figure with the reference 105, represents any already known and preexisting P2P network, with which the localized network maintains a backward compatibility. The legacy network 105 may be any one among the preexisting global P2P networks presently available, such as for example a decentralized P2P network. Briefly, the legacy network 105 comprises a plurality of nodes which may be arranged according to any one among the known P2P network architectures. The legacy network 105 is provided with an indexing system (not shown in the figure), which has the purpose of listing the content files shared by the nodes belonging to the legacy network 105 as well as those stored by nodes forming the localized network. As it is well known to those skilled in the art, such indexing system is exploited for performing look-up operations necessary for the identification of which nodes are storing (chunks of) a specific requested content file. The legacy network 105 and its corresponding indexing system may be either of the unstructured type or of the structured type, or it may be server based. In the second case, the indexing system may be based on a distributed hash table, such as in the kademlia communication protocol. As it is well known to those skilled in the art, a hash table (or hash map) is a data structure that uses a hash function to efficiently map certain identifiers or keys to associated values. The hash function is used to transform the key into the index (the hash) of an array element where the corresponding value is to be sought. Distributed hash tables are a class of decentralized distributed systems that provide a lookup service similar to a hash table. Particularly, in a network having associated therewith a distributed hash table, such distributed hash table is adapted to store (key, value) pairs, and any participating node of the network can efficiently retrieve the value associated with a given key. Responsibility for maintaining the mapping from keys to values is distributed among the various nodes of the network, in such a way that a change in the set of participants causes a minimal amount of disruption.

The legacy network 105 will not be described in greater detail later on, because not relevant to the scope of the present invention.

The second level of the P2P network 100, i.e., the localized network, is partitioned into a plurality of n different sub-networks, identified in FIG. 1 with the references 110(i), i=1 to n. Each sub-network 110(i) is formed by a corresponding plurality of nodes, indicated with the references Pj(i), j=1, 2, . . . .

According to an embodiment of the present invention, all the nodes Pj(i) included in a same sub-network 110(i) belong to a same corresponding autonomous system AS(i). Thus, as it is well known to the skilled technicians, the Internet Protocol (IP) numbers of the nodes Pj(i) belonging to a same sub-network 110(i) own connected routing prefixes which are under the control of one or more network operators that present a common, clearly defined routing policy to the Internet.

Each sub-network 110(i) forms an independent decentralized P2P network provided with a corresponding indexing system to be exploited for performing look-up operations directed to the search and identification of content files shared among the nodes Pj(i) of the sub-network 110(i). According to an embodiment of the present invention, the sub-networks 110(i) are of the structured type, with the indexing system of each sub-network 110(i) that is a decentralized distributed system based on a respective distributed hash table DHT(i), like in the kademlia communication protocol. From now on, the indexing system of a generic sub-network 110(i) will be referred with the term "distributed hash table DHT(i)". The distributed hash table DHT(i) is distributed among the nodes Pj(i) forming the corresponding sub-network 110(i); as it is well known to those skilled in the art, this means that the responsibility for managing and maintaining the indexing system is distributed among the nodes Pj(i) of the sub-network 110(i). It has to be appreciated that unlike the legacy network 105, whose indexing system is capable of providing a look-up service directed to the content files shared among all the nodes of the legacy network 105 and all the nodes Pj(i) of all the sub-network 100(i), the distributed hash table DHT(i) of a generic sub-network 110(i) provides a look-up service directed to the content files shared among the nodes Pj(i) of such sub-network 100(i) only.

The nodes Pj(i) of a generic sub-network 110(i) belong to the legacy network 105, too, and are capable of interacting with other nodes of the legacy network 105 that do not belong to such sub-network 110(i) for uploading/downloading content files stored only therein. As will be described in greater detail in the following of the present description, the nodes Pj(i) of the sub-networks 110(i) are back compatible with the other nodes of the legacy network 105, so as to allow nodes Pj(i) of a sub-network 110(i) which do not store a requested content file to carry out look-up operations directed to the searching of such content file exploiting the indexing system of the legacy network 105.

According to an embodiment of the present invention, the distributed hash table DHT(i) of each sub-network 110(i) is provided with data regarding the localization of the nodes Pj(i) forming such sub-network 110(i); from now on, the data relating the localization of a generic node Pj(i) will be briefly referred to as localization data LD. As already cited in the introduction of the present document, obtaining precise localization data LD of a node Pj(i) is not an easy task. For this purpose, according to an embodiment of the present invention, the localization data LD of a generic node Pj(i) can be derived from information provided by the ISP by means of which such node Pj(i) has gained access to the P2P network 100.

More particularly, according to an embodiment of the present invention, the localization data LD of a generic node Pj(i) include three parameters, and namely a first parameter AS which identifies the autonomous system AS(i) corresponding to the sub-network 110(i) including such node Pj(i), a second parameter G which identifies the geographic area in which such node Pj(i) is located, and a third parameter POP which identifies the Point Of Presence (POP) provided by the ISP and used by such node Pj(i) for accessing the P2P network 100. Such three-parameter arrangement is particularly suited for the currently available network topologies, and especially for the European ones; however, similar considerations apply in case of localization data LD including a different number of parameters, e.g., identifying the state and/or the region in which a node Pj(i) is located.

The localization data LD have a granularity that corresponds to the POP parameter, which is the more specific one among the three parameters. According to an embodiment of the present invention, the localization data LD is a string of bits having the same length of two IPv4 addresses. This allows the localization data LD to be transmitted in an easy way by reusing well-known transmission protocols.

The way the localization data LD are generated and communicated to the distributed hash table DHT(i) of each sub-network 110(i) strongly depends on the technology employed by the various ISP used by the nodes Pj(i) for accessing the network.

In case an ISP assigns the IP addresses by means of a Dynamic Host Configuration Protocol (DHCP) server, such ISP may transmit the localization data LD to a corresponding node Pj(i) through a specific DHCP option. Since the localization data LD have a granularity corresponding to the parameter POP, it is sufficient that said DHCP option includes the localization data LD corresponding to the POP used by such node Pj(i). This solution does not violate the privacy of the user of the node Pj(i). Indeed, if an ISP automatically transmits the localization data LD to all the nodes Pj(i) that it serves, and not only to the nodes Pj(i) that use them for exploiting the services offered by the P2P network 100, the ISP cannot get whether an user of a generic node Pj(i) is actually connected to the P2P network 100 or not. Even if such solution is quite cheap by an implementative point of view, the presence of routers, firewalls and/or the adoption of systems different from the DHCP may impede the transferring of the localization data LD from the ISP to the nodes Pj(i).

For this purpose, the above mentioned solution may be improved by exploiting a Domain Name System (DNS). Particularly, a node Pj(i) which is interested to known its localization data LD may forward a specific requests to the ISP, which will respond based on the IP address of the requester.

Since some ISP would deny the forwarding of the localization data LD, according to an embodiment of the present invention the P2P network 100 is provided with a localization data LD auto-detection system. More particularly, the parameter AS can be easily derived from public databases that can be incorporated in the clients, while the parameter G may be set to a default value. The parameter POP may be instead derived through a heuristic way, for example by directly asking the user of a data processing system corresponding to a node Pj(i) the town/city wherein such data processing system is physically located.

As will be described in greater detail in the following of the present description, once a node Pj(i) of a sub-network 110(i) has received its localization data LD, the latter are memorized in the corresponding distributed hash table DHT(i) together with the list of the content files owned by such node Pj(i).

Figure 2:
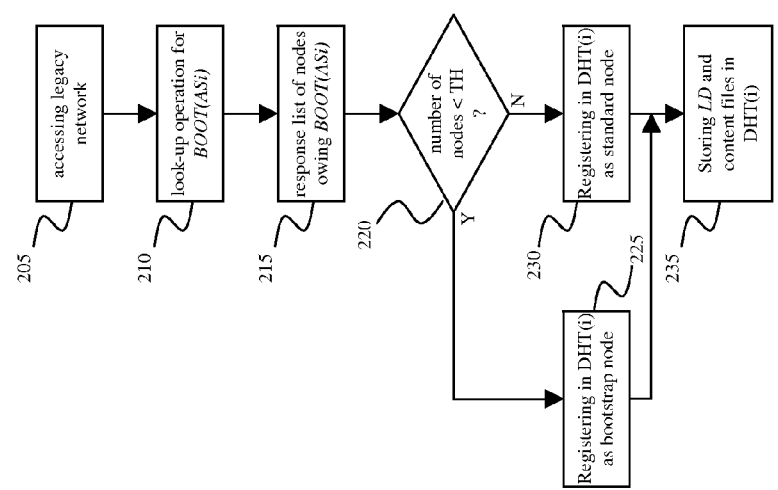
FIG. 2 depicts a flow chart illustrating the main phases performed by a generic node of the P2P network of FIG. 1 during the connection thereto according to an embodiment of the present invention.

FIG. 2 depicts a flow chart 200 illustrating the main phases performed by a generic node Pj(i) during its connection to a corresponding sub-network 110(i) of the P2P network 100 according to an exemplary embodiment of the present invention.

Since each sub-network 110(i) is an independent decentralized P2P network, which does not include a dedicated node acting as a server, the bootstrapping of such sub-networks is carried out by using some random nodes Pj(i) as "bootstrap nodes". Without descending into particulars well known to those skilled in the art, the nodes Pj(i) belonging to a particular sub-network 110(i) that operate as bootstrap nodes are used as entry points of such sub-network 110(i). According to an embodiment of the present invention, the bootstrap nodes of a sub-network 110(i) are provided with a specific bootstrap flag file BOOT(ASi) which identifies the autonomous system AS(i) corresponding to such sub-network 110(i). Thus, in order to identify which nodes Pj(i) among those belonging to a sub-network 110(i) are bootstrap nodes for such sub-network 110(i), it is sufficient to carry out a look-up operation for searching the bootstrap flag file BOOT(ASi).

Making reference to FIG. 2, when a data processing system (e.g., a computer) tries to establish a connection with the P2P network 100 for becoming a node Pj(i) of a sub-network 110(i), it firstly accesses the legacy network 105 (block 205) using the services offered by an ISP. According to one among the solutions previously described, such data processing system acquires its localization data LD, which includes—among the other parameters—the parameter AS identifying an autonomous system AS(i).

Once such data processing system has gained access to the legacy network 105, it is possible to carry out look-up operations by exploiting the indexing system of such legacy network 105. In particular, a first look-up operation is performed for searching if any node Pj(i) already exists that owns the bootstrap flag file BOOT(ASi) relating to the autonomous system AS(i) identified by the parameter AS (block 210).

The legacy network 105 replies by providing a response list comprising the IP addresses of the nodes Pj(i) that share the requested bootstrap flag file BOOT(ASi), together with the cryptographic hash of the flag file BOOT(ASi) (block 215). As already described in the previous of the present description, the nodes Pj(i) which share such bootstrap flag file BOOT(ASi) are the bootstrap nodes of the sub-network 110(i) corresponding to the autonomous system AS(i).

At this point, since it is strongly desirable that the number of bootstrap nodes is sufficiently higher, a check is made for assessing whether the actual number of bootstrap nodes Pj(i) of the sub-network 110(i) is lower than a predetermined threshold TH (e.g., equal to 200) or not.

In case the actual number of bootstrap nodes of the sub-network 110(i) is lower than the threshold TH (exit branch Y of block 220), the data processing system is registered in the distributed hash table DHT(i) as a new bootstrap node Pj(i) of the sub-network 110(i) (block 225); if instead the actual number of bootstrap nodes of the sub-network 110(i) is higher than the threshold TH (exit branch N of block 220), the data processing system is registered in the distributed hash table DHT(i) as a "standard" node Pj(i) of the sub-network 110(i) (block 230).

Once the node Pj(i) has been registered in the distributed hash table DHT(i), the link of such node Pj(i) to the sub-network 110(i) is actually established. At this point, the node Pj(i) shares in the distributed hash table DHT(i) the list of the content files that it owns associating them with its localization data LD and (block 235).

The procedure described above requires to be modified in case the ISP used by the data processing system for the connection to the P2P network 100 makes use of a private addressing system through a Network Address Translation (NAT) apparatus. In this case, the IP address detected by the legacy network 105 would correspond to that provided by the NAT apparatus, and the bootstrap would not be performed correctly. In order to solve this drawback according to an embodiment of the present invention, the local IP address of a data processing system which has been registered as a bootstrap node Pj(i) in the distributed hash table DHT(i) is communicated in the place of the cryptographic hash of the bootstrap flag file BOOT(ASi). In this way, a new node Pj(i) may establish a connection with the bootstrap nodes Pj(i) using their local addresses.

Figure 3:
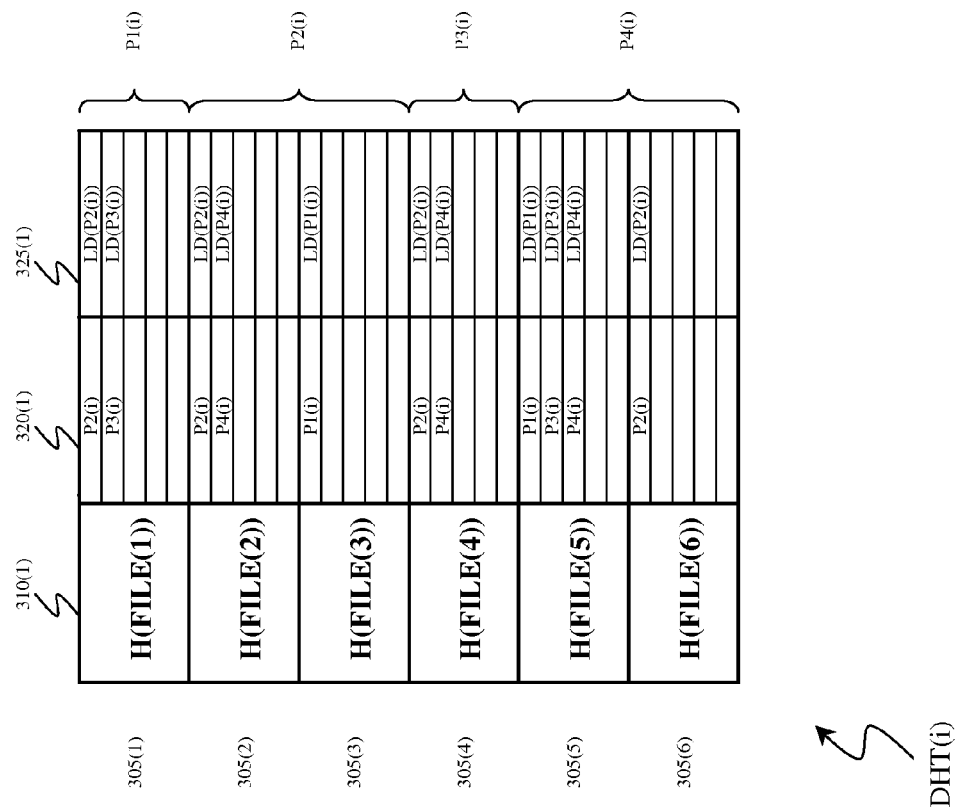
FIG. 3 schematically illustrates a portion of a distributed hash table according to an embodiment of the present invention.

A portion of an exemplary and simplified distributed hash table DHT(i) of a generic sub-network 110(i) is schematically illustrated in FIG. 3 according to an embodiment of the present invention.

In the very simplified example herein considered, the sub-network 110(i) is formed by four nodes—and particularly by the nodes Pj(i), j=1 to 4—which share six different content files, identified with the references FILE(k), k=1 to 6.

The distributed hash table DHT(i) illustrated in FIG. 3 comprises a number of rows 305(k) which is equal to the total number of the content files FILE(k) shared by the nodes Pj(i) forming the sub-network 110(i) (in the example at issue, six). Each row 305(k) comprises three fields, whose references are 310(k), 320(k) and 325(k), respectively.

The first field 310(k) of each row 305(k) is adapted to store the hash of the content file FILE(k) determined by applying a hash function to such content file FILE(k), referred to as H(FILE(k)); as will be described in greater detail in the following of the description, the hash H(FILE(k)) is used as a key for the look-up of the content file FILE(k) among the content files shared by the nodes Pj(i) of the sub-network 110(i).

The second field 320(k) of each row 305(k) is adapted to store a list showing the nodes Pj(i) of the sub-network 110(i) which store a copy of the content file FILE(k) (or a chunk thereof). In greater detail, for each node Pj(i) storing a copy of the content file FILE(k), the list stored in the field 320(k) provides the IP address and the port number of such node Pj(i). In the example considered, copies of the content file FILE(1) are stored in the nodes P2(i) and P3(i), copies of the content file FILE(2) are stored in the nodes P2(i) and P4(i), a copy of the content file FILE(3) is stored in the node P1(i), and so on.

The third field 325(k) of each row 305(k) is adapted to store a list showing the localization data LD of each node Pj(i) included in the list of the corresponding second field 320(k).

The distributed hash table DHT(i) is decentralized, in the sense that the data stored therein and the data structures used for the storing of such data are distributed among the various nodes Pj(i) forming the sub-network 110(i). For the sake of simplicity, the DHT(i) illustrated in FIG. 3 is depicted as a centralized table; however, such table has to be intended as it were distributed among the nodes Pj(i) of the sub-network 110(i). Particularly, the data stored in each row 305(k)—or group of rows—of the distributed hash table DHT(i) of FIG. 3 may be stored and managed by a corresponding set of nodes Pj(i) of the sub-network 110(i). A node Pj(i) which stores the data corresponding to a row 305(k) of the distributed hash table DHT(i) is referred to as the node Pj(i) responsible for the content file FILE(k) corresponding to said row 305(k). In the example considered, the node P1(i) is the node responsible for the content file FILE(1), the node P2(i) is the node responsible for the content files FILE(2) and FILE(3), the node P3(i) is the node responsible for the content file FILE(4), and the node P4(i) is the node responsible for the content files FILE(5) and FILE(6).

Figure 4:
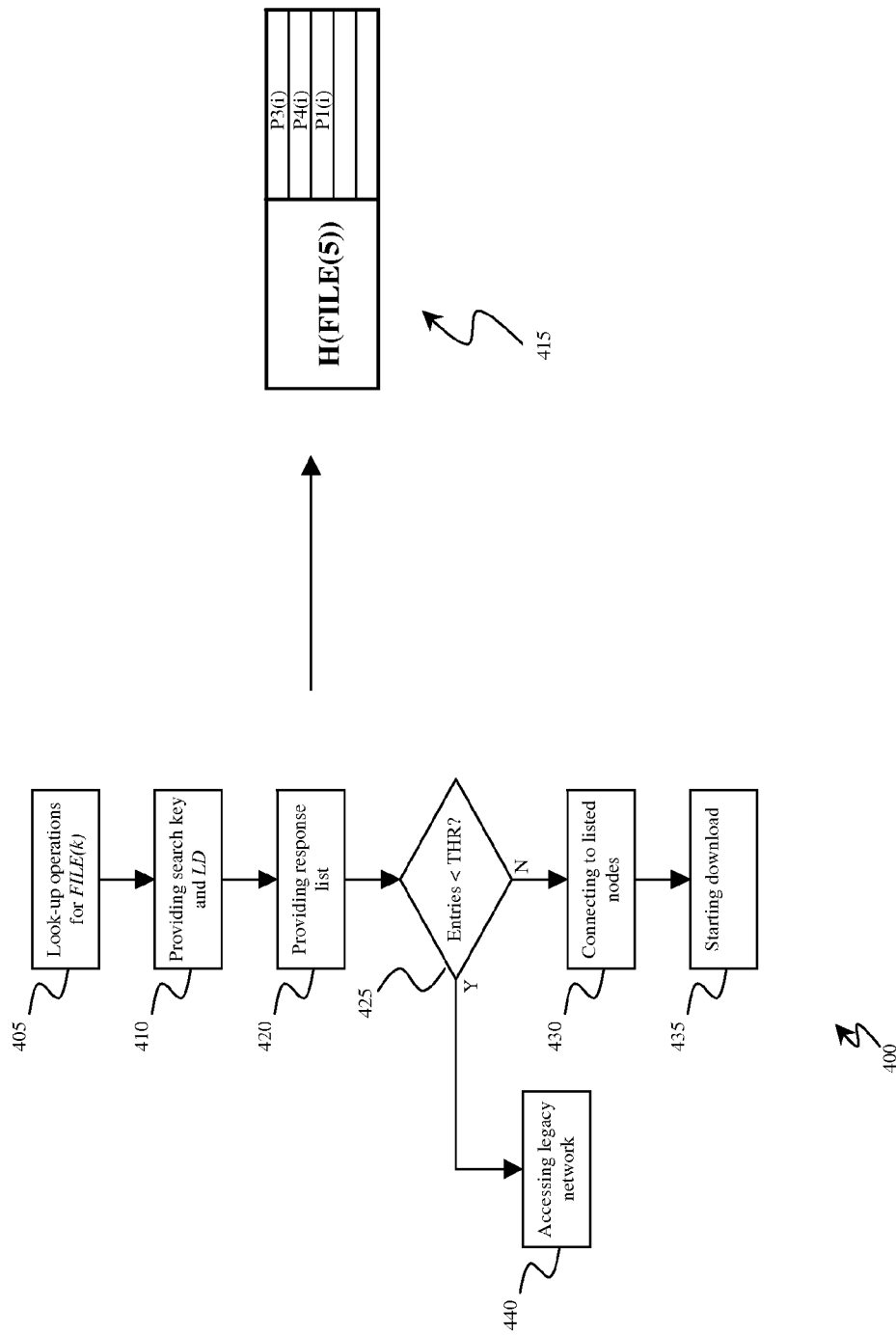
FIG. 4 depicts a flow chart illustrating the main phases performed by a generic node of the P2P network of FIG. 1 during look-up operations directed to the search and identification of a specific content file according to an embodiment of the present invention.

FIG. 4 depicts a flow chart 400 illustrating the main phases performed by a generic node Pj(i) connected to the distributed hash table DHT(i) of a sub-network 110(i) during the look-up operations directed to the search and identification of a specific content file FILE(k) to be downloaded according to an embodiment of the present invention.

When a node Pj(i) belonging to the sub-network 110(i) desires to find a specific content file FILE(k), such node Pj(i) contacts the distributed hash table DHT(i) of the sub-network 110(i) for performing a look-up of such content file FILE(k) (block 405).

As it is well known to the skilled technicians, the look-up operations performed in a DHT network of the type of the P2P network 100 are typically constituted by two different look-up operations to be performed in succession one after the other. The first look-up operation, also referred to as "name search", is performed using (portions of) the name of the requested file as key; the result of such first look-up operation is a list comprising the hash of the files shared by the nodes of the network that (at least partially) correspond to the requested file name. Once the correct file has been identified, a second look-up operation is performed, which is also referred to as "hash search". The second look-up operation uses the hash of such file as key; the result of the second look-up operation is a list comprising the IP addresses of the nodes of the network that actually share the file corresponding to such hash. For the sake of the simplicity, the exemplary look-up operation described in the flow chart 400 of FIG. 4 makes reference mainly to the hash search. However, a more detailed description of the name search will be provided in the following of the present specification.

According to an embodiment of the present invention, the look-up of the desired content file FILE(k) is started by providing to the distributed hash table DHT(i) a search key (i.e., the name of the content file FILE(k)) together with the localization data LD of the node Pj(i) which has requested the content file (block 410).

The distributed hash table DHT(i) outputs a corresponding response list—an example of which is illustrated in FIG. 4 with the reference 415—comprising the IP addresses and ports of the nodes Pj(i) belonging to the sub-network 110(i) that actually store copies of the desired file FILE(k) (block 420).

According to an embodiment of the present invention, the results shown in the response list 415 are ordered according to a closeness criterion which quantifies the closeness of the node Pj(i) requesting the content file FILE(k) with the nodes Pj(i) that are listed in the response list 415. Such closeness criterion consists of comparing the localization data LD sent by the requesting node Pj(i) with the localization data LD corresponding to the nodes Pj(i) that are listed in the response list 415.

In greater detail, based on the received search key, the DHT(i) selects the row 305(k) whose field 310(k) is storing the hash H(FILE(k)) of the requested content file FILE(k), so as to retrieve the list stored in the field 320(k) that shows the nodes Pj(i) of the sub-network 110(i) storing a copy of the requested content file FILE(k) (see FIG. 3). Making reference to the example illustrated in FIG. 3, wherein the sub-network 110(i) is formed by four nodes Pj(i) sharing a total of six content files FILE(k), and assuming that the requesting node Pj(i) is requesting the content file FILE(5), the response list 415 will include the IP addresses and ports of the nodes Pj(i) listed in the field 320(5), i.e., the nodes P1(i), P3(i), and P4(i).

As previously mentioned, according to an embodiment of the present invention the results provided by the response list 415 are ordered in a sequence based on a comparison between the localization data LD of the requesting node Pj(i) (which data are received together with the search key) and the localization data LD of the nodes Pj(i) listed in the field 320(k) of the row 305(k) corresponding to the requested file FILE(k) (which data are listed in the field 325(k)).

According to an exemplary embodiment of the present invention, such sequence is ordered by firstly positioning a first set including the IP addresses and ports of the nodes Pj(i) having both the parameter G and the parameter POP equal to the parameter G and to the parameter POP of the requesting node Pj(i), respectively. Then, such first set is followed in the sequence by a second set including the IP addresses and ports of the nodes Pj(i) having only the parameter G equal to the parameter G of the requesting node Pj(i). The sequence ends with a third set including the IP addressed and ports of the remaining nodes Pj(i) (which however have the same parameter AS, being connected to the same sub-network 110(i)). The order of the nodes Pj(i) within each set is irrelevant.

It has to be appreciated that the data provided by the distributed hash table DHT(i) to the requesting node Pj(i) through the response list 415 do not explicitly include the localization data LD of the nodes Pj(i) listed therein, in such a way not to violate the privacy of the users of such nodes.

Returning back to the flow chart 400 of FIG. 4, if the response list 415 has a number of entries higher than a predetermined threshold THR (exit branch N of block 425), the requesting node Pj(i) tries to establish a connection with the nodes Pj(i) listed in the response list 415 following the specific order provided in such list (block 430). As will be described in greater detail in the following of the present invention, every time the requesting node Pj(i) tries to establish a connection with a particular node Pj(i), the former node provides its localization data LD to the latter node.

Once the requesting node Pj(i) has established a connection with one or more of the nodes Pj(i) listed in the response list 415, the download of the requested content file FILE(k) is started (block 435).

If the response list 415 has a number of entries lower than the threshold THR (exit branch Y of block 425), it means that the requested content file FILE(k) is shared by a too low number of the nodes Pj(i) of the sub-network 110(i). In this case, the request for such content FILE(k) may be forwarded to the legacy network 105 (block 440). This possibility is contemplated since the nodes Pj(i) of the sub-networks 110(i) are back compatible with the legacy network 105; in this way, look-up operations directed to the searching of such content file FILE(k) may be carried out by exploiting the indexing system of the legacy network 105. The way the legacy network 105 performs such look-up operations will not be described, because not relevant to the scope of the present invention.

As already mentioned in the introduction of the present description, a severe drawback affecting the P2P networks employed for implementing file sharing services, such as the P2P network 100, regards the difficulty with which the content files FILE(K) that are quite uncommon in a sub-network 110(i)—i.e., those files that are shared only by a small number of nodes Pj(i) of the sub-network 110(i)—can be downloaded. This problem is particularly exacerbated when such content files FILE(k) are requested by a relatively high number of nodes Pj(i) of the sub-network 110(i) at the same time.

In order to solve this problem, a solution according to an embodiment of the present invention provides for a distributed caching system adapted to automatically access if a generic content file FILE(k) shared by the nodes Pj(i) of a sub-network 110(i) has to be cached or not, and, in the affirmative case, generate additional copies of such content file FILE(k) to be stored in some of the nodes Pj(i) of such sub-network 110(i).

For this purpose, according to an embodiment of the present invention the distributed hash table DHT(i) of each corresponding sub-network 110(i) stores additional data regarding the actual diffusion of the content files FILE(k) among the nodes Pj(i) of the sub-network 110(i) and the number of pending requests concerning them.

Figure 5:
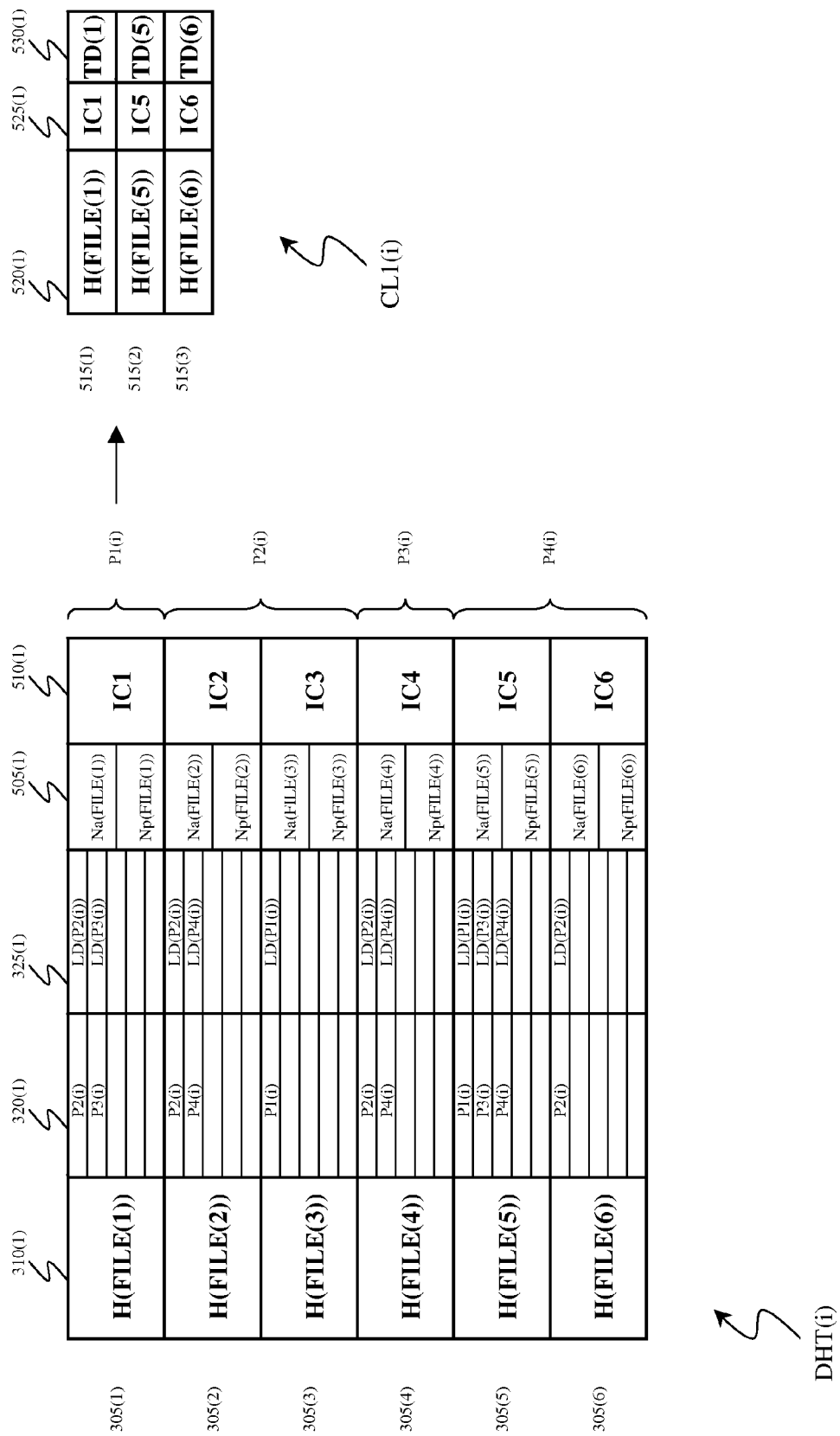
FIG. 5 schematically illustrates a portion of a distributed hash table according to an embodiment of the present invention.

Making reference to FIG. 5, according to an exemplary embodiment of the present invention each row 305(k) of the distributed hash table DHT(i) further includes a fourth field, identified in the figure with the reference 505(k). The field 505(k) is adapted to store two numeric parameters Na, Np quantifying how the content file FILE(k) corresponding to the row 305(k) is requested and how it is diffused among the sub-network 110(i).

In greater detail, the parameter Na corresponds to the number of pending download requests for such content file FILE(k) that have been submitted by nodes Pj(i) of the sub-network 110(i). In other words, the parameter Na is equal to the number of nodes Pj(i) that have requested the content file FILE(k), but which have not still started the download. The parameter Np is instead related to the number of nodes Pi(i) of the sub-network 100(i) actually storing (chunks of) the content file FILE(k). According to an exemplary embodiment of the present invention, the parameter Np corresponding to a specific content file FILE(k)—referred to as Np(FILE(K))— is weighted according to the percentage of the content file FILE(k) actually possessed by the various nodes Pj(i). For example, the parameter Np corresponding to a content file FILE(k) may be calculated as:

$$Np(FILE(k)) = N_{100} + N_{75} \cdot 0.875 + N_{50} \cdot 0.625 + N_{25} \cdot 0.375 + N_0 \cdot 0.125,$$

wherein the parameters $N_{100}$, $N_{75}$, $N_{50}$, $N_{25}$, $N_0$ are the number of nodes Pj(i) of the sub-network 110(i) storing at least the 100%, 75%, 50%, 25% and 0% of the content file FILE(K), respectively. The multiplication coefficient of each parameter among the parameters $N_{75}$, $N_{50}$, $N_{25}$, $N_0$ is obtained by calculating a normalized average value of the percentages corresponding to the same parameter and to the previous parameter. For example, the multiplication coefficient 0.875 corresponds to the normalized average value among the percentage 100% and the percentage 75%. Naturally, the concepts of the present invention can be applied even if the parameter Np is calculated in a different way.

According to an embodiment of the present invention, it is possible to assess whether a content file FILE(k) needs to be cached or not based on a comparison between the parameters Na and Np of such content file stored in the distributed hash table DHT(i). Essentially, the higher the parameter Na with respect to the parameter Np, the higher the number of pending download requests for such content file FILE(k) with respect to the number of copies actually available within the sub-network 110(i), and thus, the higher the need of caching such content file FILE(k).

For this purpose, according to an exemplary embodiment of the present invention each row 305(k) of the distributed hash table DHT(i) further includes a fifth field, identified in the figure with the reference 510(k), which is adapted to store a criticality index ICk calculated based on the parameters Na and Np listed in the field 505(k); for example, the criticality index ICk may be determined according to the following relationship:

$$ICk = \frac{Na(FILE(k))}{Np(FILE(k))} \cdot \frac{1}{8} \quad \text{if } Na(FILE(k)) > t$$

$$ICk = 0 \quad \text{otherwise,}$$

Wherein t is a predetermined threshold, and ⅛ is a normalizing factor. Therefore, as can be easily inferred by observing the above relationship, the higher the criticality index ICk, the higher the need of caching the content file FILE(k). It has to be appreciated that the criticality index ICk is set to zero if the content file FILE(k) is requested by a small number of nodes Pj(i) (equal or lower than the threshold t).

According to an embodiment of the present invention, when a generic node Pj(i) of a sub-network 110(i) decides (or is instructed) to offer a portion of its disk space for caching purposes, the choice of which content file FILE(k) is to be cached is performed based on the corresponding criticality index ICk. More in detail, each node Pj(i) locally stores a criticality list CLj(i) including the criticality indexes ICk of a set of content files FILE(k) among the content files FILE(k) shared by the nodes of the sub-network 110(i). The choice of which content files FILE(k) are inserted into the criticality list CLj(i) of a node Pj(i) will be described later on.

According to an embodiment of the present invention, when a node Pj(i) decides to offer a portion of its disk space for caching purposes, it selects the content files FILE(k) of the criticality list CLj(i) having the highest criticality indexes ICk.

An example of a possible criticality list CLj(i) stored by the node P1(i) according to an embodiment of the present invention is illustrated in FIG. 5 with the reference CL1(i). Each criticality list CLj(i) includes a set of rows 515(1) each one corresponding to a specific content file FILE(k). For example, the exemplary criticality list CL1(i) illustrated in FIG. 5 includes three rows, and particularly a first row 505(1) corresponding to the content file FILE(1), a second row 515(2) corresponding to the content file FILE(5), and a third row 515(3) corresponding to the content file FILE(6). Each row 505(1) includes a first field 520(1) adapted to store the hash H(FILE(k)) of the content file FILE(k) corresponding to such row, a second field 525(1) adapted to store the criticality index ICk of the content file FILE(k), and a third field 530(1) adapted to store time data TD(k) providing an indication of the "freshness" of the criticality index ICk, i.e., an indication of when such criticality index ICk has been updated for the last time in the criticality list. Making reference to the exemplary criticality list CL1(i) illustrated in FIG. 5, if the node P1(i) decides to cache a content file FILE(k), the selection will occur among the content files FILE(1), FILE(5) and FILE(6) based on the criticality indexes IC1, IC5 and 106.

Once a node Pj(i) has chosen the content file FILE(k) to be cached, it starts the download thereof On this regard, it has to be underlined that the nodes Pj(i) that are downloading a content file FILE(k) for caching purposes are not numerated for the calculation of the parameter Na corresponding to such content file FILE(k).

According to an embodiment of the present invention, every time two nodes Pj(i) of the sub-network 110(i) enter in communication to each other—both during the bootstrap operations and the look-up operations, e.g., because one of them is requesting a particular content file FILE(k) to the other one—, information is exchanged between the criticality lists CLj(i) of such nodes Pj(i). Particularly, if the criticality list CLj(i) of a node Pj(i) includes a criticality index ICk which is not still listed in the criticality list CLj(i) of the other node Pj(i), the row 515(1) corresponding to such criticality index ICk is copied and added to the criticality list CLj(i) of the latter node Pj(i). If instead different versions of a same criticality index ICk are listed in both the criticality lists CLj(i) of the two nodes, the criticality list CLj(i) including the oldest version thereof is updated with the criticality index ICk of the other criticality list CLj(i). In order to assess which version of the criticality index ICk is the oldest, a comparison is made among the time data TD(k) stored in both the critically lists CLj(i).

In this way, the update of the criticality indexes ICk can be advantageously performed during the operation of the P2P network 100, increasing the reliability of the caching service. Particularly, while the criticality list CLj(i) of a node Pj(i) that has been recently registered in the distributed hash table DHT (i) may include only the criticality indexes ICk of the content files FILE(k) for which such node is the responsible in the distributed hash table DHT(i), with the passage of time such criticality list CLj(i) is enriched with the information taken from the criticality lists CLj(i) of the other nodes Pj(i) of the sub-network 110(i) with which such node enters in communication.

Compared with the present P2P networks, the P2P network 100 that has been described until now allows the download efficiency of the content files FILE(k) shared among the nodes Pj(i) to be drastically increased. This increased efficiency is obtained thanks to the improvements in the look-up operations due to the possibility of localizing the nodes Pj(i) within their sub-networks 110(i), and thanks to the presence of an improved caching system which takes into account the criticality of the content files FILE(k).

It has to be appreciated that according to the proposed solution each node Pj(i) included in a sub-network 110(*i*) is configured to act both as a peer node performing downloads of requested content files FILE(k) which are stored in other nodes Pj(i), and at the same time as a cache node offering disk space to be exploited by other nodes Pj(i) for caching purposes. In this way, a higher degree of privacy is guaranteed to the users of the sub-network 110(*i*). Indeed, by observing the traffic occurring among the various nodes Pj(i) of the sub-network 110(*i*), it is not possible to distinguish the downloads carried out for caching purposes from the downloads carried out for the retrieval of explicitly requested content files FILE(k).

Moreover, the possibility of offering disk space for caching purposes by the nodes Pj(i) of a P2P network introduces a copyright problem which may be considered was novel in the P2P system field. Particularly, the user of a node Pj(i) which is offering its disk space for caching a copy of a content file FILE(k) would have the duty of verifying whether such content file FILE(k) is copyright protected or not.

A solution according to an embodiment of the present invention provides for overcoming said drawbacks by making each user of a node Pj(i) which is caching a content file FILE(k) agnostic to such content file FILE(k).

In order to explain how such nodes Pj(i) are made agnostic to the content files FILE(k) that they are caching according to an embodiment of the present invention, preliminary considerations are to be made on how the look-operations are performed in the P2P networks of the type of the P2P network 100. Specifically, as already mentioned in the previous of the present description, such look-up operations are performed in two steps to be performed in succession one after the other, and particularly:
- a name search performed using the name of the requested content file FILE(k) as a key, which search outputs the hash H(FILE(k)) of such file, and
- a hash search performed using the hash H(FILE(k)) as a key, which search outputs the list comprising the IP addresses of the nodes Pj(i) that actually share the content file FILE(k).

While the name search has not been described yet, the hash search has been described in detail in the FIGS. 3-5.

Making reference to the P2P network 100 described herein, both the name search and the hash search performed by a generic node Pj(i) of a sub-network 110(*i*) are carried out exploiting the distributed hash table DHT(i) corresponding to said sub-network 110(*i*). Therefore, for the sake of clarity, the distributed hash table DHT(i) will be now considered as a two-level table. Particularly, the first level of the distributed hash table DHT(i)—referred to as first level table—is used during the name search, while the second level of the distributed hash table DHT(i)—referred to as second level table—is used during the hash search. It has to be appreciated that the hash table DHT(i) which has been illustrated in the FIGS. 3 and 5 was in reality a second level table, being used for the hash search.

According to an embodiment of the present invention, the nodes Pj(i) are made agnostic to the content files FILE(k) that they are caching by means of an encryption system used during both the generation of the distributed hash table DHT(i) and during the name and hash searches.

Figure 6:
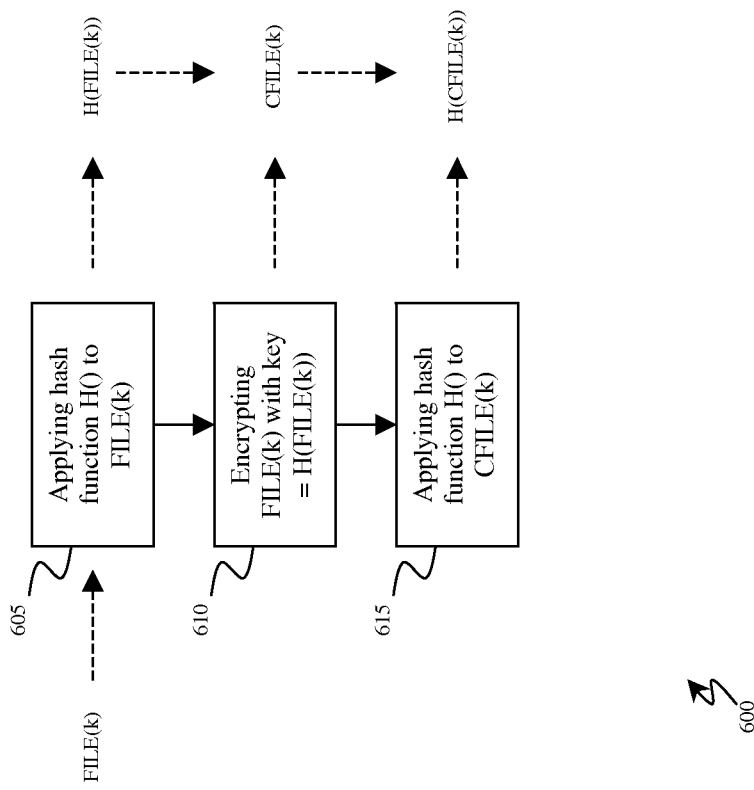
FIG. 6 depicts a flow chart illustrating how a first level table of a distributed hash table is generated according to an embodiment of the present invention.

FIG. 6 depicts a flow chart 600 illustrating how a first level table of a distributed hash table DHT(i) is generated according to an embodiment of the present invention.

Once a node Pj(i) storing a new content file FILE(k) to be shared is connected to the sub-network 110(*i*), the hash H(FILE(k)) of such content file FILE(k) is determined by applying a hash function to the latter (block 605).

Then, the content file FILE(k) is encrypted with a symmetric key encryption algorithm (e.g., AES, Serpent or Twofish) using the previously calculated hash H(FILE(k)) as cryptographic key (block 610). The encrypted version of such content file FILE(k) is referred to as "encrypted content file", and is identified with the reference CFILE(k).

The next step provides for calculating the hash H(CFILE(k)) of the encrypted content file CFILE(k) using the same hash function used for generating the hash H(FILE(k)) (block 615).

Figure 7:
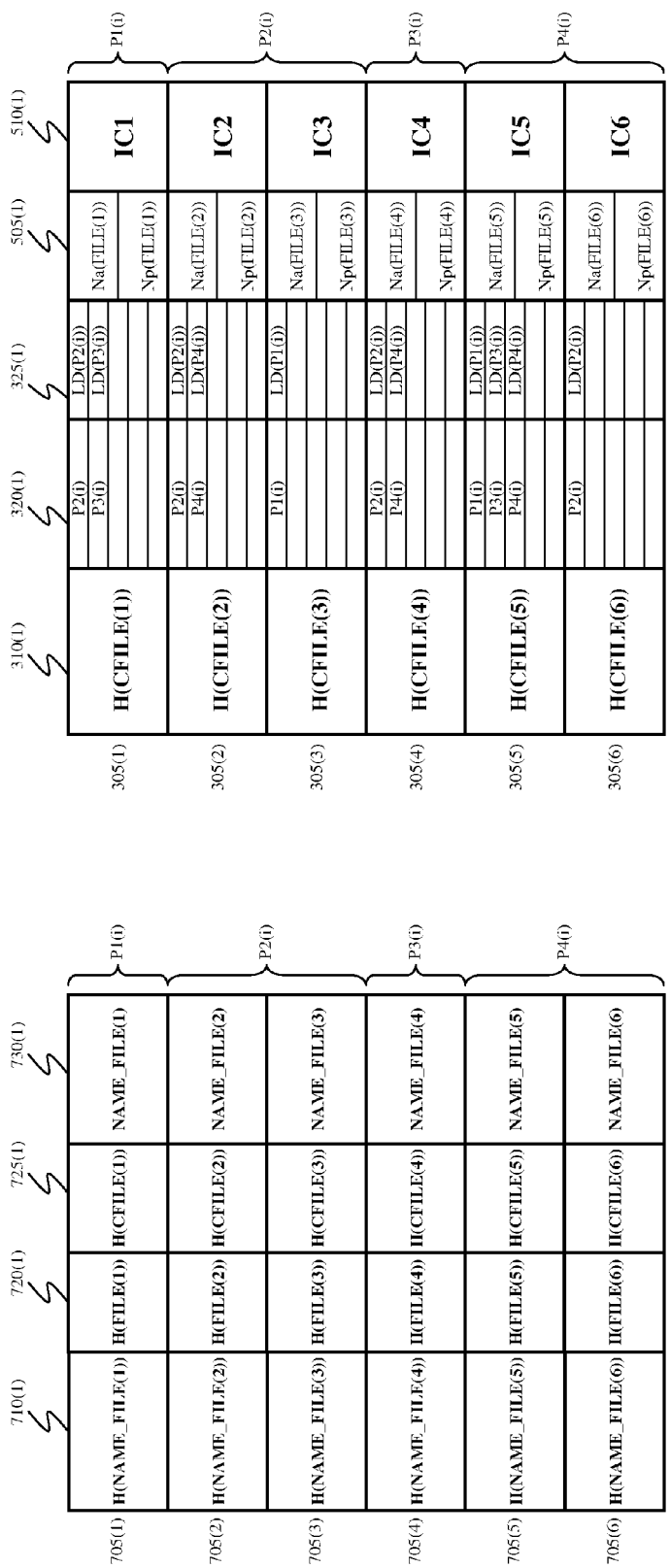
FIG. 7 schematically illustrates a first level table and a second level table of a distributed hash table according to an embodiment of the present invention.

According to an embodiment of the present invention, such data are used for generating the first level table of the distributed hash table DHT(i), an example of which is illustrated in FIG. 7 with the reference 1DHT(i). Particularly, the example at issue corresponds to the example already considered in the previous of the present description, wherein the sub-network 110(*i*) is formed by four nodes P1(*i*), P2(*i*), P3(*i*) and P4(*i*), while the number of content files FILE(k) shared by such nodes is equal to 6; each content file FILE(k) is univocally identified by a corresponding name string NAME_FILE(k). In order to simplify the description, it will be assumed that each name string NAME_FILE(k) identifying a respective content file FILE(k) is formed by a single word; however, the concepts of the present invention can be easily generalized to more complex (and realistic) cases, in which each name string NAME_FILE(k) may be formed by a sequence of more than one words.

The first level table 1DHT(i) comprises a number of rows 705(*k*) which is equal to the total number of the content files FILE(k) shared by the nodes Pj(i) forming the sub-network 110(*i*) (in the example at issue, six). Each row 705(*k*) comprises four fields, whose references are 710(*k*), 720(*k*), 725(*k*) and 730(*k*), respectively.

The first field 710(*k*) of each row 705(*k*) is adapted to store the hash of the name string NAME_FILE(k), which hash is calculated by applying the same hash function used for generating the hash H(FILE(k)); the hash of the name string NAME_FILE(k) is referred to as H(NAME_FILE(k)). As will be described in greater detail in the following of the present description, the hash H(NAME_FILE(k)) is used as a search key for performing the name search. The second field 720(*k*) is adapted to store the hash H(FILE(k)) of the content file FILE(k), while the third field 725(*k*) is adapted to store the hash H(CFILE(k)) of the encrypted content file CFILE(k). The fourth field 730(*k*) of the row 705(*k*) is instead adapted to store the name string NAME_FILE(k) of the content file FILE(k).

In the same way as for the distributed hash table DHT(i) illustrated in FIG. 3, the first level table 1DHT(i) is depicted in FIG. 7 as a centralized table for the sake of simplicity. However, such table is distributed among the nodes Pj(i) of the sub-network 110(*i*). Like in the example of FIG. 3, the node P1(*i*) is the node responsible for the content file FILE(1), the node P2(*i*) is the node responsible for the content files FILE(2) and FILE(3), the node P3(*i*) is the node responsible for the content file FILE(4), and the node P4(i) is the node responsible for the content files FILE(5) and FILE(6).

FIG. 7 also illustrates an example of a corresponding second level table of the distributed hash table DHT(i)—referred to as 2DHT(i)—according to an embodiment of the present invention. The second level table 2DHT(i) is equal to the distributed hash table DHT(i) which has been already described making reference to FIG. 5, with the only difference that the first field 310(k) of each row 305(k) thereof is adapted to store the hash H(CFILE(k)) of the encrypted content file CFILE(k) instead of the hash H(FILE(k)) of the content file FILE(k).

Figure 8:
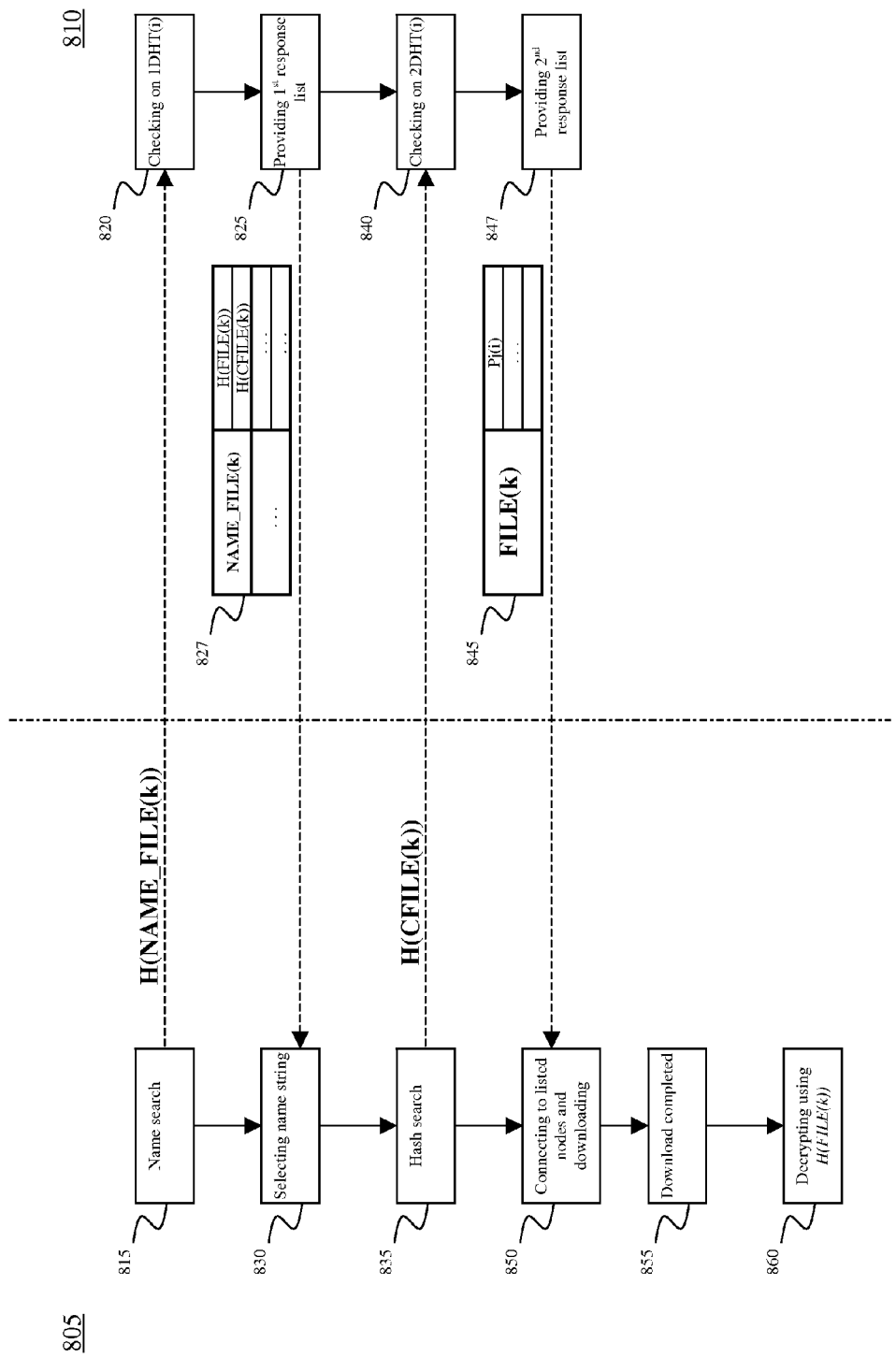
FIG. 8 depicts a flow chart illustrating the main phases performed by a node of the P2P network of FIG. 1 during a name search and a hash search of a specific content file according to an embodiment of the present invention.

In order to describe how the first level table 1DHT(i) and the second level table 2DHT(i) of the distributed hash table DHT(i) are exploited for made agnostic the nodes Pj(i) of the sub-network 110(i) to the content files FILE(k) that they are caching according to an embodiment of the present invention, reference will be now made to the flow chart 800 illustrated in FIG. 8.

The flow chart 800 illustrates the main phases performed by a node Pj(i) of a sub-network 110(i) and by the corresponding distributed hash table DHT(i) during a look-up operation (name search and hash search) of a generic content file FILE (k) identified by a name string NAME_FILE(k) and during the download thereof according to an embodiment of the present invention. In order to better figure how the node Pj(i) interacts with the distributed hash table DHT(i), the flow chart 800 depicts the operations performed by the node Pj(i) and the operations performed by the distributed hash table DHT(i) in two dedicated "lanes", identified in the figure with the references 805 and 810, respectively.

The first step of the look-up operation consists in the name search. Particularly, the node Pj(i) queries the distributed hash table DHT(i), using the hash H(NAME_FILE(k)) of the name string NAME_FILE(k) as a search key (lane 805, block 815).

Once the distributed hash table DHT(i) has received the hash H(NAME_FILE(k)), a check is made on the first level table 1DHT(i), directed to assess if there exists a row 705(k) thereof having the field 710(k) that stores such hash H(NAME_FILE(k)) (lane 810, block 820).

Then, the distributed hash table DHT(i) provides a first response list 827 including the hash H(FILE(k)), the hash H(CFILE(k)) and the name strings NAME_FILE(k) taken from the rows 705(k) of the first level table 1DHT(i) having the field 710(k) that stores such hash H(NAME_FILE(k)) (lane 810, block 825). It has to be appreciated that in the simplified example at issue, wherein each content file FILE (k) is identified by a respective name string NAME_FILE(k) formed by a single word. In the more realistic cases, wherein the content files FILE(k) are identified by name strings NAME_FILE(k) formed by more than one word, the search key used by the node Pj(i) may correspond to only a portion of the complete name string NAME_FILE(k); in this case, the first response list 827 will include the hash H(FILE(k)), the hash H(CFILE(k)) and the (complete) name strings NAME_FILE(k) taken from all the rows 705(k) of the first level table 1DHT(i) having a word of the (complete) name string NAME_FILE(k) that corresponds to such search key.

Then, the node Pj(i) selects a specific name string NAME_FILE(k) among those included in the first response list 827 (lane 805, block 830), and temporarily memorizes the hash H(FILE(k)) and the hash H(CFILE(k)) corresponding to such name string NAME_FILE(k) (i.e., the ones taken from the same row 705(k) of the first level table 1DHT(i) having the field 730(i) storing such selected name string).

The next step of the look-up operation consists in the hash search, which is substantially equal to that already described in FIG. 4, with the only difference that the search key used by the node Pj(i) for querying the distributed hash table DHT(i) is the hash H(CFILE(k)) of the encrypted content file CFILE (k) instead of the hash H(FILE(k)) of the content file FILE(k).

Briefly, the distributed hash table DHT(i) is first queried by the node Pj(i) with a search key equal to the hash H(CFILE (k)) corresponding to the selected name string NAME_FILE (k) (lane 805, block 835). As already described in the previous of the present description (and particularly during the description of the flow chart 400 illustrated in FIG. 4), such search key is provided to the distributed hash table DHT(i) together with the localization data LD of the node Pj(i) which has made the request.

Once the distributed hash table DHT(i) has received the hash H(CFILE(k)) and the localization data LD, a check is made on the second level table 2DHT(i), for retrieving the row 305(k) thereof having the field 310(k) that stores such hash H(CFILE(k)) (lane 810, block 840).

Then, the distributed hash table DHT(i) outputs a corresponding second response list 845 comprising the IP addresses and ports of the nodes Pj(i) belonging to the sub-network 110(i) that actually store copies of the encrypted content file CFILE(k) corresponding to the requested content file FILE(k) (lane 810, block 847). Particularly, such second response list 845 includes the nodes Pj(i) listed in the field 320(k) of the second level table 2DHT(i) ordered according to the closeness criterion previously described with reference to FIG. 4.

At this point, the node Pj(i) which has requested the download of the content file FILE(k) tries to establish a connection with the nodes Pj(i) listed in the second response list 845 following the specific order provided in such list (lane 805, block 850).

It has to be appreciated that, unlike in the solution described with reference to FIG. 4, since the various content files FILE(k) shared by the nodes Pj(i) of the sub-network 110(i) have been registered in the distributed hash table DHT (i) in an encrypted way, the actual file that will be downloaded by the requesting node Pj(i) is the encrypted content file CFILE(k), and not the (plain) content file FILE(k).

Once the requesting node Pj(i) has completed the download of the encrypted content file CFILE(k) (lane 805, block 855), the node Pj(i) is able to decrypt it using the hash H(FILE (k)) of the (plain) content file FILE(k) that has been previously memorized (in the block 830 of the flow chart 800) as a cryptographic key (lane 805, block 860).

With the proposed solution, all the content files FILE(k) are shared by the nodes Pj(i) of the sub-networks 110(i) in an encrypted way only; indeed, the downloads are directed to the encrypted content files CFILE(k) only, and not to the (plain) content files FILE(k). The decryption keys for decrypting such encrypted content files CFILE(k) are however available in the distributed hash table DHT(i), since they are the hash H(FILE(k)) of the (plain) content files FILE(k) stored in the field 720(k) of the first level table 1DHT(i). In order to perform a download of a desired content file FILE(k), a node Pj(i) has to know both the hash H(CFILE(k))—for retrieving the nodes Pj(i) storing copies of the encrypted content file CFILE(k)—and the hash H(FILE(k))—for decrypting the downloaded encrypted content file CFILE(k). The only way for a node Pj(i) to know both the hash H(CFILE(k)) and the hash H(FILE(k)) is being a node Pj(i) that has done a name search using the name string NAME_FILE(k). If a node Pj(i) is not in possession of both such hash H(CFILE(k)), H(FILE (k)), it is not capable of retrieving a plain version of the content file FILE(k). This condition can be advantageously exploited for making agnostic the nodes Pj(i) to the content files FILE(k) that they are caching. Indeed, according to this solution, a node Pj(i) that has accepted to offer its disk space for caching a copy of a high-requested content file FILE(k) actually stores an encrypted version thereof (i.e., the encrypted content file CFILE(k)) without having the decryption key required for retrieving the plain content file FILE(k) (i.e., the hash H(FILE(k))). In this way, the user of a node Pj(i)

cannot retrieve which type of content FILE(k) is caching, overcoming the abovementioned copyrights drawbacks.

In order to further improve the efficiency and the reliability of the P2P network 100, it would be desirable to implement a traffic engineering feature, i.e., a mechanism that enables the ISPs to redirect a part of the traffic from heavily loaded or congested links to less used, and therefore more available, ones.

For this purpose, it would be sufficient that the ISPs were instructed to send to each node Pj(i) data regarding their network topology and the congestion state of each link. In this way it would be possible to strongly improve the load balancing among links, exploiting said additional information for better ordering the results provided by the distributed hash tables DHT(i) during the look-up operations. However, as previously mentioned in the introduction of the present description, information of such type is usually considered as confidential.

For this purpose, according to a further embodiment of the present invention, the P2P network 100 is provided with a "hierarchical caching" feature.

In greater detail, according to an embodiment of the present invention each sub-network 110(*i*) of the P2P network is provided with two different types of additional nodes Pj(i) which are directly controlled by the ISPs, referred to as "cache master nodes" and "cache slave nodes".

The cache master nodes have a high knowledge of the topology and the status of the network, and are used for improving the traffic routing among the other nodes. The cache master nodes are not used for storing content files to be shared among the other nodes, thus they generate a relatively small amount of additional traffic. In order to be capable of constantly updating the information regarding the topology and the status of the network, the cache master nodes may for instance be placed in specific network locations (e.g. in main POPs or in the Network Operations Centre).

The cache slave nodes lack of any information regarding the topology and the status of the network, but are instead used to store content files for caching purposes. Since the cache slave nodes generate a relatively high amount of traffic, they may be located close to the standard nodes of the network, for example within the main POPs.

The cache master nodes perform look-up operations exploiting the distributed hash table DHT(i) in the same way as previously described; however, once a cache master node has obtained from the distributed hash table DHT(i) the list including the ordered sequence of nodes that actually store copies of the desired content file, it does not initiate the download by self, but rather instructs one or more of the cache slave nodes to perform the download. According to an embodiment of the present invention, the content files stored in the cache slave nodes are registered in the corresponding distributed hash table DHT(i) by the cache master nodes, and not by the cache slave nodes.

In order to be distinguished from the standard nodes of the network, a master cache node have to inform the corresponding distributed hash table DHT(i), for example setting the parameter G to a dedicated value that does not correspond to any known geographic area.

According to an embodiment of the present invention, in response to a look-up operation directed to the search and identification of a specific content file, the response list comprising the ordered sequence of the nodes storing such content file (such as the response list 415 or the second response list 845) which is provided by the distributed hash table DHT(i) may be modified so as to include at least one cache master node if the requested content file is cached. Particularly, the cache master node may be inserted among the results listed in the response list in a position between the positions of the nodes belonging to the same POP of the node that has performed the request and the position of those belonging to its same geographic area. When the requesting node contacts the cache master node included in the response list, it is redirected to a cache slave node. According to an embodiment of the present invention, the distributed hash table DHT(i) may shift the position of a cache master node within the nodes listed in the response list by few positions in an unpredictable way, in such a way to avoid that the requesting node is capable of detecting information about the address pools allocated to its POP.

Naturally, in order to satisfy local and specific requirements, a person skilled in the art may apply to the solution described above many logical and/or physical modifications and alterations. More specifically, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a matter of general design choice.

For example, the method according to the various embodiments of the proposed solution may be implemented through a suitable software (referred to as client software) to be installed on the data processing systems forming the nodes. Such client software may be a stand-alone module or a plug-in.

Similar considerations apply if the client software which may be used to implement each embodiment of the invention is structured in a different way, or if additional modules or functions are provided. In any case, such client software may take any form suitable to be used by any data processing system or in connection therewith (for example, within a virtual machine); particularly, the client software may be in the form of external or resident software, firmware, or microcode (either in object code or in source code—for example, to be compiled or interpreted). Moreover, it is possible to provide the client software on any computer-usable medium; the medium can be any element suitable to contain, store, communicate, propagate, or transfer the software. For example, the medium may be of the electronic, magnetic, optical, electromagnetic, infrared, or semiconductor type; examples of such medium are fixed disks (where the software can be pre-loaded), removable disks, tapes, cards, wires, fibers, wireless connections, networks, broadcast waves, and the like. In any case, the solution according to an embodiment of the present invention lends itself to be implemented even with a hardware structure (for example, integrated in a chip of semiconductor material), or with a combination of software and hardware.

The invention claimed is:

1. A method for enabling sharing of content files among nodes of a peer-to-peer (P2P) network, the P2P network comprising a plurality of sub-networks, each sub-network including a respective plurality of nodes capable of storing content files, wherein each sub-network has associated therewith a corresponding hash table for indexing the content files stored in the nodes of the sub-network, portions of the hash table being distributed among at least some of the nodes of the sub-network, and wherein, for each content file stored in at least one node of the sub-network, the hash table comprises a corresponding node list of the sub-network nodes which store the content file, the method comprising:
associating each node of the sub-network listed in the node list corresponding to a content file with localization data comprising at least one of three localization data parameters providing an indication of the localization of the node within the sub-network, and
when a node of the P2P network requests downloading of a selected content file, causing the requesting node to provide localization data of the node and causing the requesting node to obtain a preferential list of nodes storing the selected content file, the preferential list including a set of nodes listed in the node list as storing the selected content file, the nodes of the set being ordered based on a comparison between at least one localization data parameter of the requesting node and at least one localization data parameter of the nodes listed in the node list corresponding to the at least one localization data parameter of the requesting node,
wherein the at least one of three localization data parameters comprises at least one of:
a first parameter identifying an autonomous system corresponding to the sub-network which includes the node;
a second parameter identifying a geographic area in which the node is located; and
a third parameter identifying a point of presence used by the node for accessing the P2P network.

2. The method of claim 1, wherein:
the nodes included in a same sub-network belong to a same corresponding autonomous system.

3. The method of claim 2, wherein
each node included in a sub-network gains access to the P2P network by a corresponding access service provider, and
the localization data associated with the node are based on at least one of:
information retrieved from the access service provider corresponding to the node, or
information provided already available at the node.

4. The method of claim 2, wherein the localization data comprises three localization data parameters providing the indication of the node within the sub-network.

5. The method of claim 1, wherein causing the requesting node to obtain a list of preferential nodes storing the selected content file comprises:
causing the node to obtain from at least one other node of the respective sub-network a the preferential list corresponding to the selected content file.

6. The method of claim 5, wherein for downloading a content file, the node requesting said content file performs a first search and a second search, the first search comprising:
causing the node that requests the content file to provide to at least one other node of the respective sub-network a first search key based on a file name of the content file; and
causing at least one node of the sub-network to provide, in response to the first search key, a first response list including for each file name of content file stored in at least one node of the sub-network which corresponds to the first search key a corresponding second search key based on said content file, the second search comprising:
causing the at least one node of the sub-network to provide, in response to the second search key, the preferential list corresponding to the content file identified by the second search key, wherein:

for each content file stored in at least one node of the sub-network, the hash table comprises the first search key and the second search key corresponding to the content file.

7. The method of claim 6, wherein:
each second search key listed in the first response list is associated with a corresponding encryption key, and
the content files stored in the nodes of the sub-network are encrypted using the encryption key.

8. The method of claim 7, wherein for each content file stored in at least one node of the sub-network:
the first search key is a hash of the file name of the content file,
the encryption key is the hash of the content file, and
the second search key is a hash of the encrypted content file.

9. The method of claim 1, further comprising causing a node of a sub-network to cache content files to be downloaded by other nodes of the sub-network.

10. The method of claim 9, further comprising, for each content file stored in at least one node of a sub-network, storing in the hash table associated with the sub-network a criticality index providing an indication of the sharing of the content file among the nodes of the sub-network, the caching of content files by a node being based on the criticality index of the content files.

11. The method of claim 10, further comprising locally storing at each node of a sub-network a criticality list including the criticality indices of a sub-set of content files.

12. The method of claim 11, further comprising caching, at each node at least one content file among the sub-set of content files whose criticality indices are included in the criticality list stored in the node.

13. The method of claim 12, further comprising selecting the at least one cached content file by the node from among the sub-set of content files based on its criticality index.

14. The method of claim 11, further comprising updating the criticality list of a first node of the sub-network according to the criticality list of a second node of the sub-network when the first node and the second node enter into communication with each other.

15. The method of claim 1, wherein at least some of the nodes of the sub-network store the portions of the hash table corresponding to the at least one content file for which the respective node is responsible.

16. The method of claim 1, further comprising establishing a connection with at least one of the nodes in the preferential list according to the order of the nodes in the preferential list of nodes.

17. A P2P network comprising a plurality of sub-networks, each sub-network including a respective plurality of nodes capable of storing content files, wherein each sub-network has associated therewith a corresponding hash table for indexing the content files stored in the nodes of the sub-network, portions of the hash table being distributed among at least some of the nodes of the sub-network, and wherein, for each content file stored in at least one node of the sub-network, the hash table comprises a corresponding node list of the sub-network nodes which store the content file,
wherein the plurality of nodes are configured to:
associate each node of the sub-network listed in the node list corresponding to a content file with localization data comprising at least one of three localization data parameters providing an indication of the localization of said node within the sub-network,
when a node of the P2P network requests downloading of a selected content file, cause the requesting node to provide localization data of the node and cause the requesting node to obtain a preferential list of nodes storing the selected content file, the preferential list including a set of nodes listed in the node list as storing the selected content file, the nodes of the set being ordered based on a comparison between at least one localization data parameter of the requesting node and at least one localization data parameter of the nodes listed in the node list corresponding to the at least one localization data parameter of the requesting node, wherein the at least one of three localization data parameters comprises at least one of:
a first parameter identifying an autonomous system corresponding to the sub-network which includes the node;
a second parameter identifying a geographic area in which the node is located; and
a third parameter identifying a point of presence used by the node for accessing the P2P network.

18. A non-transitory computer readable storage medium storing software executable by a node of a P2P network, the P2P network comprising a plurality of sub-networks each one including a respective plurality of nodes capable of storing content files, wherein each sub-network has associated therewith a corresponding hash table for indexing of the content files stored in the nodes of the sub-network, portions of said hash table being distributed among at least some of the nodes of the sub-network, wherein, for each content file stored in at least one node of the sub-network, the hash table comprises a corresponding node list of the sub-network nodes which store the content file, and wherein each node of the sub-network listed in the node list corresponding to a content file is associated with localization data providing an indication of the localization of the node within the sub-network, the software comprising instructions that, when executed by a computer, perform:

requesting the downloading of a selected content file;
receiving corresponding localization data comprising at least one of three localization data parameters;
obtaining a preferential list of nodes storing the selected content file, the preferential list including a set of nodes listed in the node list as storing the selected content file, the nodes of the set being ordered based on a comparison between the at least one localization data parameter of the corresponding localization data and at least one localization data parameter of the nodes listed in the node list corresponding to the at least one localization data parameter of the corresponding localization data; and
downloading the content file from nodes of the P2P network based on the preferential list,
wherein the at least one of three localization data parameters comprises at least one of:
a first parameter identifying an autonomous system corresponding to the sub-network which includes the node;
a second parameter identifying a geographic area in which the node is located; and
a third parameter identifying a point of presence used by the node for accessing the P2P network.

19. The non-transitory computer readable storage medium of claim 18, wherein downloading the content file from nodes of the P2P network based on the list of preferential nodes comprises:
establishing a connection with at least one of the preferential nodes according to the order of the preferential list of nodes.

* * * * *